Patented May 16, 1933

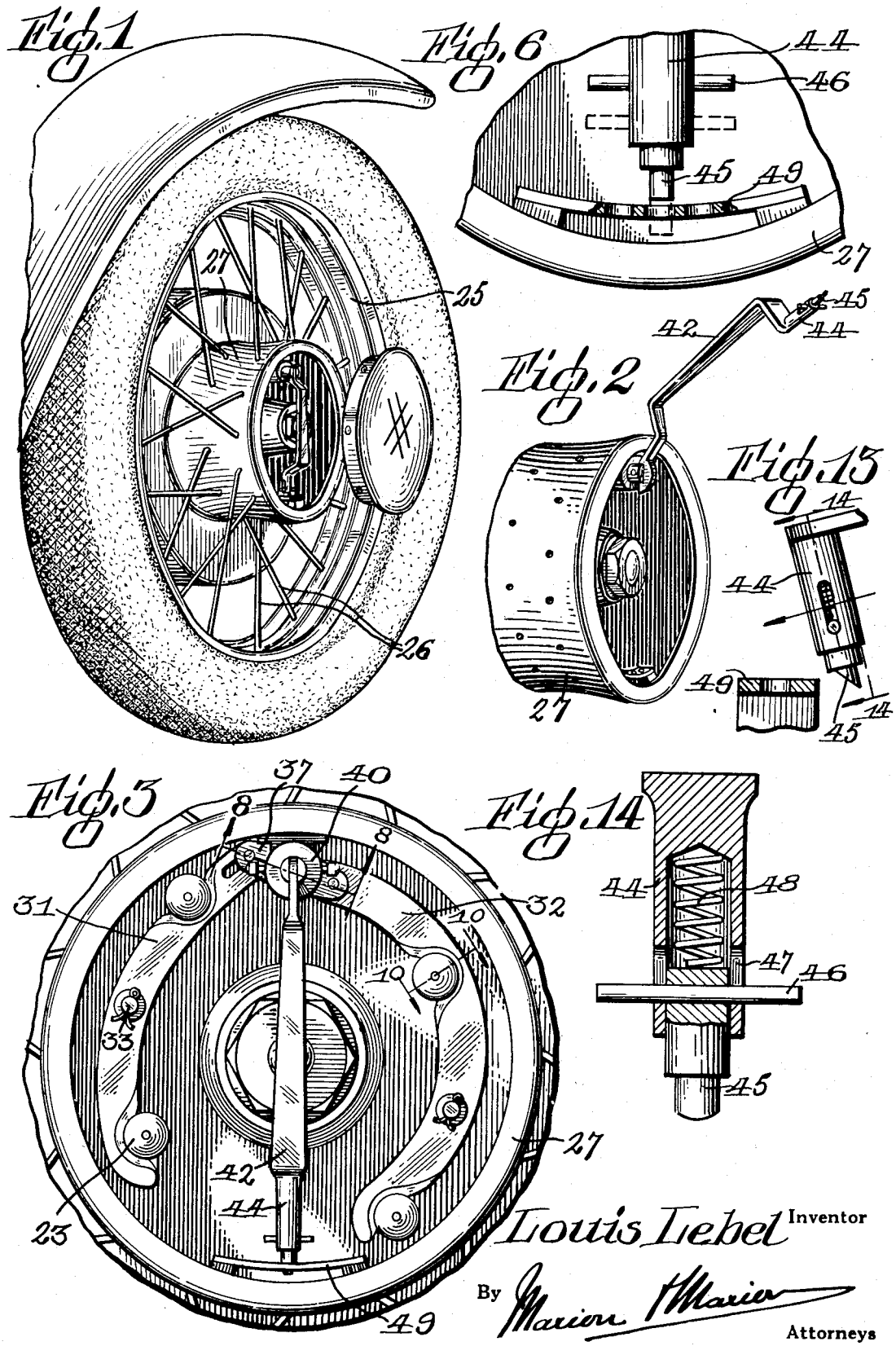

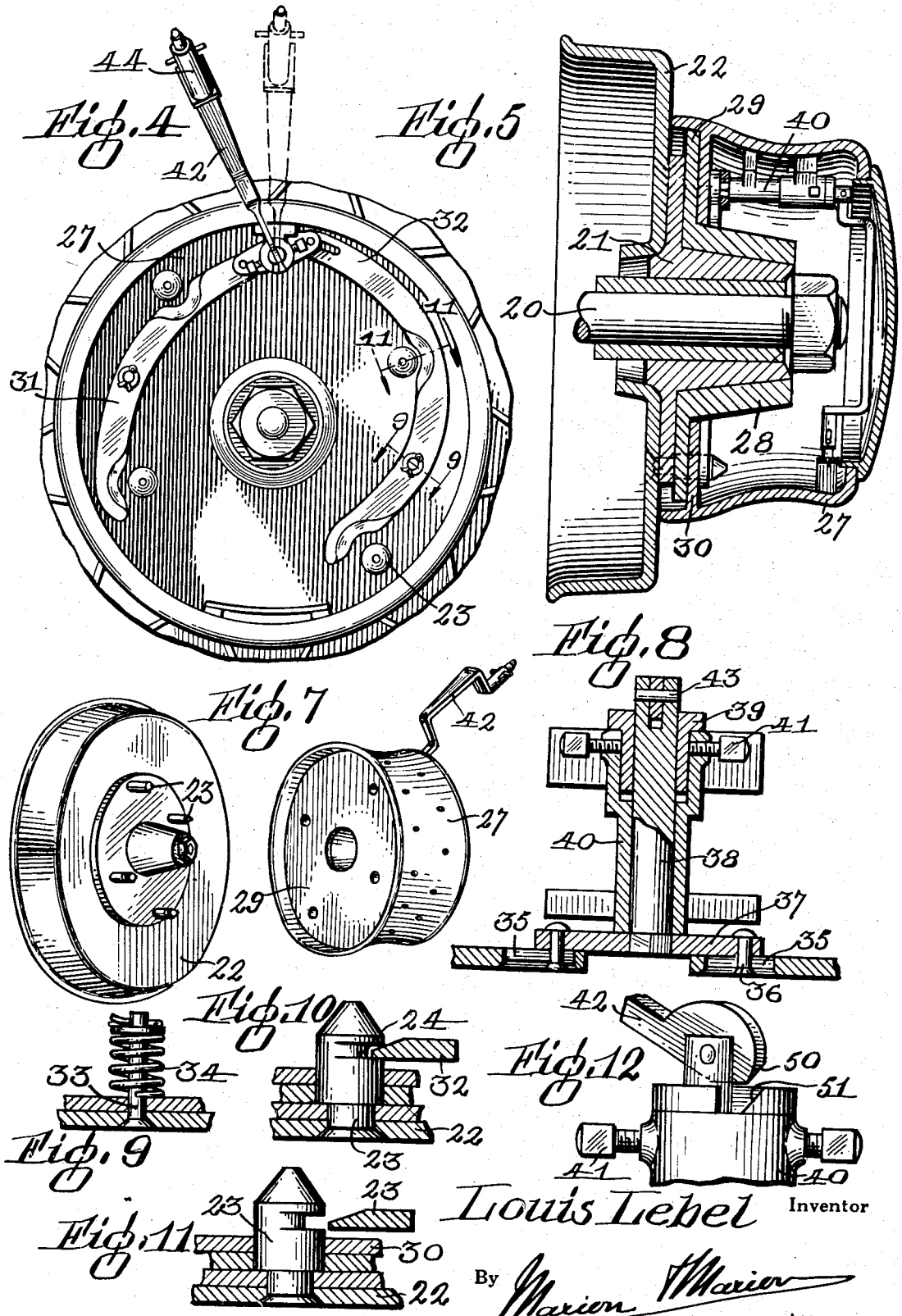

1,909,286

UNITED STATES PATENT OFFICE

LOUIS LEBEL, OF MONTREAL, QUEBEC, CANADA, ASSIGNOR TO JOSEPH J. ROSENTHAL, OF NEW YORK, N. Y.

DEMOUNTABLE WHEEL

Application filed February 24, 1932. Serial No. 594,932.

The present invention relates to improvements in demountable wheels.

An important object of the invention is the provision of a demountable wheel equipped with locking means designed so that the wheel may be quickly and easily mounted in operative position on a vehicle axle or removed therefrom.

A further object of the invention is the provision of a demountable wheel constructed so that the same may be operatively connected with a vehicle axle without using tools or implements of any kind.

Another object of the invention is the provision of a demountable wheel equipped with axle engaging means designed so as to effectively secure the wheel in position on the axle.

Still another object of the invention is the provision of a demountable wheel, having means for locking the wheel on the axle attached to the wheel hub and operable by means of an adjustable lever.

Other objects and advantages of the invention will become apparent as the description progresses.

In the accompanying drawings forming a part of this specification and in which like reference characters are employed to designate corresponding parts throughout the same:

Figure 1 is a perspective view of a front wheel of a vehicle showing the improved demountable wheel structure in locking position, Figure 2 is a perspective view of the hub showing the actuating lever in a partly raised position, Figure 3 is a front view of the wheel hub showing the locking mechanism disposed in a wheel locking position, Figure 4 is a similar view showing the mechanism adjusted to a wheel releasing position, Figure 5 is a transverse sectional view through the wheel hub and vehicle axle with the mechanism in locking position, Figure 6 is a fragmentary front elevation showing a portion of the free end of the lever with the locking bolt in retracted position, Figure 7 is a perspective view showing the wheel hub detached from the vehicle axle, Figure 8 is a transverse sectional view taken on the line 8—8 of Figure 3, Figure 9 is an enlarged sectional view taken on the line 9—9 of Figure 4, Figure 10 is a similar view taken on the line 10—10 of Figure 3, Figure 11 is a similar view taken on the line 11—11 of Figure 4, Figure 12 is a fragmentary elevational view showing the connection of the operating lever with the pivot mechanism, Figure 13 is a fragmentary side elevational view of the free end of the operating lever at its closing arrangement with respect to the rack it engages in fastening position, Figure 14 is an enlarged longitudinal section taken on the line 14—14 of Figure 13.

Referring to the drawings, wherein for the purpose of illustration is shown a preferred embodiment of the invention, the numeral 20 designates the spindle of an automobile axle, having secured thereon a flanged bushing 21. Attached, in the usual manner, to the bushing flange is a brake drum 22. Rigidly connected with the drum and projecting outwardly therefrom, parallel with the spindle, are a plurality of, in the present instance 4, wheel engaging studs 23. The outer ends of the studs 23 are tapered and are provided adjacent the tapered ends with notches 24.

Detachably engageable with the axle spindle 20 is a wheel embodying the usual felly 25 connected by means of spokes 26 with a centrally disposed hub 27.

The hub 27, which is of substantially cylindrical form is provided with a central concentric sleeve 28 preferably of tapered construction to be slidably fitted over the bushing 21. The sleeve 28 is formed with an annular flange 29 which, in the present instance, is disposed against and welded to a complementary flange 30 arranged transversely in the hub. The overlapping flanges 29 and 30 are provided with apertures adapted to register with the studs 23 so that the flanges may be slidably fitted over the studs.

Pivotally connected to the hub flange and disposed on the outer side thereof are a pair of complementary locking members 31 and 32 in the form of arcuate metallic strips or segments. Each of the segments is provided with an aperture intermediate its ends fitted over a pivot pin 33 and is compressed against the hub flange by means of a spring 34. Each of the segmental members 31 and 32 is provided, at spaced intervals, with several arcuate portions arranged to engage the grooves 25 in the wheel stud 23 in locking position.

The adjacent ends of the segments 31 and 32 are provided with elongated slots 35 receiving therein pivot pins 36, rigidly attached to the extremities of an oscillatory link 37. To the central portion of the link 37 is connected an axially extending shaft 38. About the outer portion of the shaft 38 is disposed a flanged collar 39, this collar as well as the shaft being fitted in a bearing sleeve 40 rigidly connected to the hub. The collar 39 is immovably secured in the sleeve by means of set screws 41, the shaft rotating within the collar and the major portion of the sleeve.

Pivotally connected to the outwardly projecting end of the shaft 38 is an operating lever 42 having one end connected with the shaft by means of a pivot pin 43 while the opposed end is formed to provide a tubular socket 44. As shown to advantage in Figure 5, the intermediate portion of the lever 42 is offset to clear the outer end of the axle.

Slidably fitted in the socket 44 is an adjustable bolt 45 having a pin 46 extended transversely through the inner end portion and extended through opposed slots 47 in the socket wall. The bolt 45 is normally urged to a resiliently extended position through the medium of a compression spring 48 mounted in the socket and bearing against the pin. By engaging the laterally projecting ends of the pin 46 the bolt 45 will be manually retracted.

The bolt 45 is adapted to engage, in fastening position, an apertured rack bar 49 secured in the hub at a position diametrically opposed to the shaft 38. The rack 49 is mounted so that the bolt 45 may be projected into any one of several apertures provided therein.

In use, before mounting the wheel upon the axle or spindle of a motor vehicle, the locking mechanism mounted in the hub thereof is adjusted to a releasing position, that is, the lever 42 is swung in an axial plane outwardly of the hub and laterally adjusted to swing the link 37 and the segments connected therewith to eccentric positions as shown to advantage in Figure 4. The wheel is then fitted on to the axle, the studs projecting axially from the drum being disposed in alignment with the apertures in the drum flange until the wheel is properly placed on the spindle. The lever 42, which is now in an outwardly projecting position, is swung transversely from the full line position shown in Figure 4 to the dotted line position projecting radially from the hub casing. This transverse movement of the lever will swing the link from the position shown in Figure 4 to that shown in Figure 3 and cause the segments 31 and 32 to be swung in a plane transverse to the axis of the spindle to substantially concentric positions wherein the beveled portions will slide into engagement with the grooves 24 in the studs 23.

The lever 42 is thereafter swung from its radial outwardly projecting position, in an axial plane, to a diametrally extending position in the hub, the beveled face of the bolt 45 contacting with the rack 49 and enabling the bolt to be snapped into one of the apertures of the rack. Thus, the bolt securely and releasably fastens the lever in its normal retracted position and obviates accidental swinging adjustment thereof to securely lock the link 37 and segments in stud engaging positions.

In order to insure pivoted locking adjustment of the members 31 and 32 when the operating lever is swung to its inward closing position, I consider it advisable to bevel one edge of the lever at the inner end, as indicated at 50, to provide a cam surface which will coact a beveled groove 51 formed in the upper portion of the flanged collar 39. With this construction, when the lever is swung from an outwardly directed position to its inward diametrically disposed arrangement, the bevel surfaces 50 and 51 will be brought in contact so as to automatically turn the lever and the shaft 38 to thereby swing the link 37 and the segments to stud engaging positions.

With the present invention, the wheel will be releasably locked on the axle in such a manner as to enable convenient and rapid removal and replacement and will obviate the necessity of employing tools or implements during the locking or releasing operations. The structure is also designed to securely hold the wheel in proper position on the axle and to obviate accidental displacement thereof.

It is to be understood that the form of my invention herein shown and described is to be taken as a preferred example of the same, and that various changes as to the shape, size, and arrangements of parts may be resorted to without departing from the spirit of the invention or the scope of the subjoined claims.

Having thus described my invention, I claim:—

1. In a demountable wheel, the combination with an axle and a plurality of notched studs projecting axially from a drum on the axle, a wheel including a hub detachably engageable with the axle, a plurality of pivotally adjustable segments movable transversely to the axis of the axle mounted in the hub, the said segments having portions thereof formed to fit within the notches in the studs, a link connecting adjacent ends of the segments, and a lever having connection with the link adjustable to operate said link and segments to locking or releasing positions.

2. In a demountable wheel, the combination with an axle and a plurality of notched studs projecting axially from a drum on the axle, a wheel including a hub detachably engageable with the axle, a plurality of pivotally adjustable segments movable transversely to the axis of the axle mounted in the hub, the said segments having portions thereof formed to fit within the notches in the studs, a link connecting adjacent ends of the segments, a lever having connection with the link adjustable to operate said link and segments to locking or releasing positions, and means on the lever for detachably fastening the same in locking position in the hub.

3. In a demountable wheel having a hub adapted for detachable engagement with an axle and studs extending from a drum on the axle, pivoted stud engaging locking segments movable transversely to the drum axis mounted in said hub, pivoted linking means connecting adjacent ends of the segments, a lever pivoted to the linking means and movable therewith for adjusting the segments into and out of engagement with the studs, means for releasably fastening the lever in locking arrangement, and cooperating means on said lever and said hub whereby the segments are engaged with the studs before the lever can be moved fully into locking arrangement.

4. In a demountable wheel, the combination with an axle and a plurality of notched studs projecting axially from a drum on the axle, a wheel including a hub detachably engageable with the axle, centrally pivoted locking segments mounted in said hub and engageable with the notches in the studs in locking position, a link connecting adjacent ends of the segments, a lever operatively pivoted to the link for selectively manipulating the segments into or out of engagement with the studs, latching means at the free end of the lever for fastening the same in locking position on the hub, and a tapered projection at the pivoted end of the lever cooperating with a cam surface on the hub, whereby adjusting the lever into latching position on the hub automatically moves the segments into engagement with the studs.

In witness whereof I have hereunto set my hand.

LOUIS LEBEL.